UNITED STATES PATENT OFFICE.

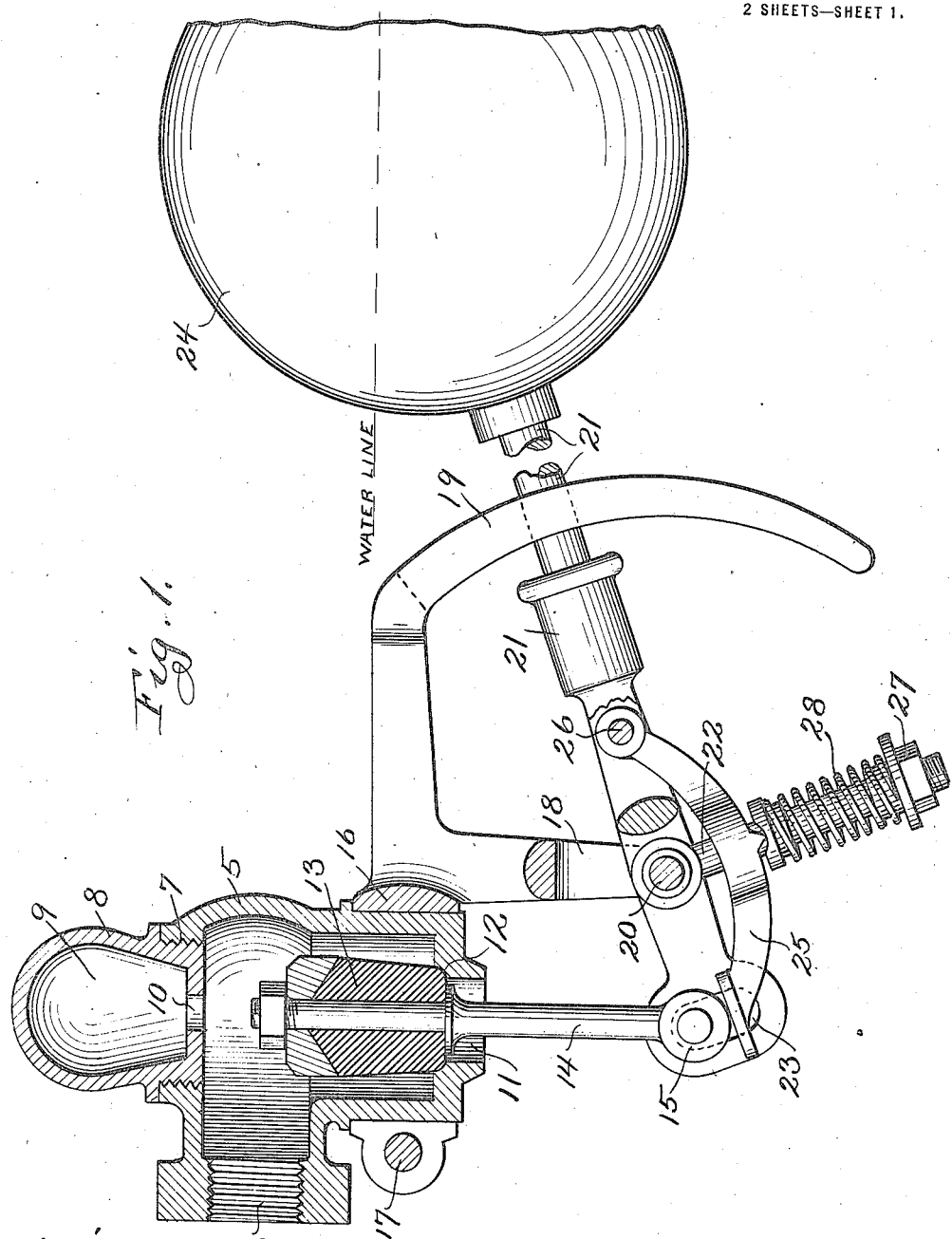

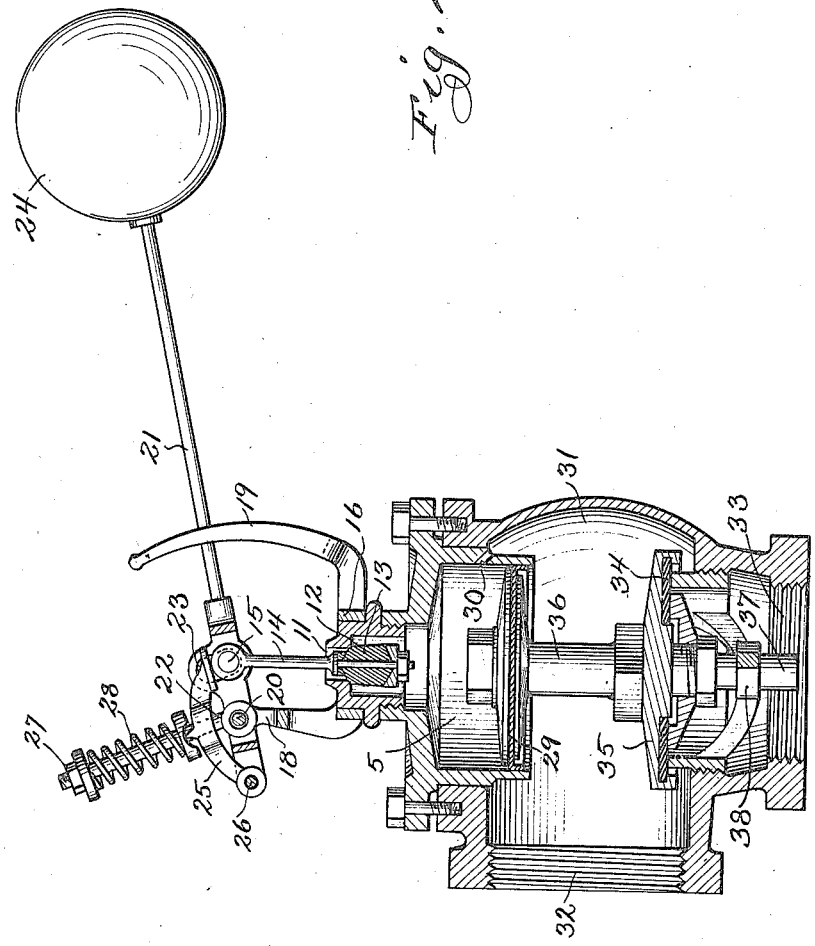

CLARENCE E. ALLGEYER, OF CHICAGO, ILLINOIS, ASSIGNOR, BY MESNE ASSIGNMENTS, TO VINCENT BENDIX, OF CHICAGO, ILLINOIS.

FLOAT OR TANK VALVE.

1,181,716.           Specification of Letters Patent.        Patented May 2, 1916.

Application filed November 16, 1907. Serial No. 402,569.

*To all whom it may concern:*

Be it known that I, CLARENCE E. ALLGEYER, a citizen of the United States, residing at Chicago, in the county of Cook and State of Illinois, have invented a new and useful Float or Tank Valve, of which the following is a specification.

My invention relates to float valves which are used to regulate the height of water in a tank by shutting off the supply of water when the water reaches a certain level and turning on the supply of water when the water goes below a certain level; and the objects of my improvements are first, to provide a quick acting valve; second, to make the valve of rubber; third, to reduce the wear and tear on the valve; fourth, to facilitate the movement of the valve in opening against the supply water pressure; fifth, to make a cheap and durable construction and other objects which will become apparent from the description to follow.

Float valves for purposes to which this invention is adaptable were heretofore made to be moved by the short arm of a pivoted lever, the long arm of said lever being provided with a float; this arrangement caused the water supply to be shut off slowly as the float was lifted by the water and in many constructions caused a disagreeable humming noise. Besides this there was always such a perceptible wear and grind on the valve and valve seat caused by the velocity of the water during the time the valve was nearly closed, that it required the valve and valve seat to be made of metal; and these would soon become unevenly worn away and cause a constant leak.

With my invention all these objectionable features are overcome, as the valve never moves slowly away from or toward its seat. This entirely dispenses with the wear on the valve from the velocity of the water, and permits the use of a rubber valve.

Another feature of my invention is that the valve when being closed moves with the flow of water instead of against it and is normally held closed by the water pressure.

I will now describe my invention so that any one versed in the art to which it pertains could make and use the same.

Referring to the accompanying two sheets of drawings forming a part of this specification: Figure 1, is a vertical section partly in elevation of a valve embodying my invention and Fig. 2, is a similar view of a modified construction showing it applied to a pilot valve.

Similar reference characters refer to similar parts throughout the several views.

In Fig. 1, 5 is the valve chamber provided with the screw threaded opening 6 which is secured to the end of a water supply pipe not shown; a screw threaded opening 7 in the top into which is secured the cap 8 provided with the air pocket or chamber 9 communicating with the interior of the valve chamber 5 through the hole 10; and a hole 11 in the bottom which is provided with the valve seat 12. A valve 13 made of rubber or similar material which is secured to a pintle 14 in the usual way is inserted through the opening 7 before the cap 8 is adjusted and normally rests on the valve seat 12, closing the opening 11. The lower end of the pintle 14 extends a material distance outside of the hole 11 and is provided with a lateral extending pin 15.

Secured to the lower exterior part of the valve chamber 5 is a collar 16 preferably split and provided with the clamping bolt 17, which has the integral fork extensions 18 and 19.

Pivoted by means of a pin or shaft 20 to the fork 18 are the float lever 21 which is forked at this point, and an eye bolt 22, the eye of which is between the forked portion of the float lever 21, and has the pin 20 passing therethrough. The short end of the float lever 21 is provided with an arcuate slot 23 struck from a center concentric with the pivotal pin 20 through which the pin 15 extends; and the long end of the float lever 21 is provided with the float 24.

From the construction thus far described it is obvious that if the device is placed in a tank and a pipe supplying a constant pressure of water is connected to the opening 6 the valve 13 will be held against its seat 12 by the pressure of water in the valve chamber 5 so long as the float 24 is held in an elevated position as shown in Fig. 1, and if the float 24 is allowed to move partly down about the pin 20 it will not effect the position of the pin 15 or valve 13 because the slot 23 in the lever 21 will simply move over the pin 15; but if the float 24 is permitted to move down further about the pin 20 the lower end of the slot 23 will contact with the pin 15 and lift the valve 13 up off its seat 12 against the pressure of water in the valve chamber 5.

It is necessary that the combined weight of the float and the long end of this lever 21 be sufficient to lift the valve 13 and its accessories against the water pressure in the valve chamber 5. Therefore a greater water pressure on the one side requires a comparatively greater weight or its equivalent on the other side.

Since water is less expansive than air, and it requires a slight compression of the fluid contained in the valve chamber 5 to open the valve 13 I prefer to provide an air pocket in communication with the valve chamber 5, for example the chamber 9.

To cause the valve 13 to move rapidly in either direction when once it starts to move I provide on the short arm of the lever 21 a spring pressed auxiliary lever 25, constantly pressing upward on the pintle 14.

The pressure of the lever 25 against the pintle 14 varies according to the relative position of the float 24 and valve 13.

The lever 25 and its coöperating spring may be arranged in any suitable manner; I prefer to pivot the lever 25 to the lever 21 at 26, provide a perforation in the lever 25 for the free passage of the bolt 22, screw a nut 27 on said bolt and interpose a coiled expanding spring 28 between the nut 27 and the lever 25.

I prefer to have the fork 19 serve as a guide for the lever 21 during its movement about the pin 20.

Fig. 1, shows the position of the device after the water-level has reached a height to lift the float 24 and close the valve 13.

The operation from this position is as follows: When the water-level lowers the float 24 will move down about the pin 20, the tension of the spring 28 will be increased, because the pivot 26 moves down while the pivots 15 and 20 remain stationary, until the lower end of the slot 23 contacts with and moves the pin 15 and valve 13 up off of its seat 12; when the valve 13 has been lifted from its seat 12 by the positive movement of the end of the slot 23 against the pin 15, the tension of the spring 28 is sufficient to force the valve 13 up against the new somewhat reduced water pressure until the pin 15 strikes against the upper end of the slot 23, and as the water lowers more the float 24 will lower until the lower end of the slot 23 again rests against the pin 15. The water from the constant supply through the opening 6 now flows through the valve chamber 5 and out through the opening 11 raising the water-level again in the tank or its equivalent containing the device. When the water-level rises the float 24 will move upward about the pin 20, reducing the tension on the spring 28, because the pivot 26 is moving up while the pivots 15 and 20 remain stationary, until the upper end of the slot 23 engages the pin 15; a further upward movement of the float 24 will move the valve 13 down toward its seat 12 and as soon as the area of the opening between the valve 13 and its seat 12 becomes less than the area of the opening 11 the velocity of the water passing through the valve chamber 5 will suddenly move the valve 13 down on to its seat 12 against the tension of the spring 28, because the tension on said spring is the least at that time. The tension of spring 28 can be adjusted by the nut 27. The movement of the valve 13 downward by the action of the water thus moves the pin 15 away from the upper end of the slot 23 and against the spring pressed lever 25, which assists the float 24 to rise on the water and this rising of the float 24 will again cause the slotted end of the lever 21 to move down so that the pin 15 rests against the upper end of the slot 23 as shown in Fig. 1.

In Fig. 2, the valve 13 is shown inverted, i. e. it is moved vertically down to be opened and is moved up to be closed; the valve may be arranged to be moved horizontally if preferred. In this view the valve 13 acts as a pilot valve to control the movement of the piston 29 in the cylindrical valve chamber 5. The hole 11 which is in the top of the valve chamber 5 is made considerably larger than a hole 30 forming communication between the valve chamber 5 and the water supply chamber 31. A constant pressure of water is kept in the chamber 31 by any source of supply as through a large pipe not shown, secured in the hole 32. The chamber 31 is also provided with a large outlet 33, concentric with the piston 29, which is furnished with the valve seat 34 against which the valve 35 is arranged to move. The valve 35 is rigidly connected to the piston 29 by means of the stem 36 and is guided in its vertical movement by the piston 29 and an integral stem 37 passing through the guide piece 38 made integral with the valve seat 34.

The operation of the valve 13 in this construction is identical with that already described only that the valve in opening and closing moves in the reverse directions. To attain the reverse action on the valve 13 by the float moving the same as is shown and described in Fig. 1, it is necessary to place the point 26 and its coöperating parts at the extreme end of the lever 21, and the pin 15 and its coöperating parts between the pivot 20 and the float 24.

The relative movements of the float 24 and the valve 13 are the same in both instances, i. e., when the float rises the valve closes and when the float moves downward the valve opens.

The area of the piston 29 is made larger than the area of the opening closed by the valve 35, so that when the valve 13 is opened the pressure in the valve chamber 5 will be reduced because the opening 11 is much greater than the hole 30 and the constant pressure in the supply chamber 31 will force the piston 29 upward into the chamber 5. This action opens the valve 35 and allows the water to flow out through the large opening 33.

When the water in the tank rises sufficiently to raise the float 24 and close the valve 13, the pressure of water in the chamber 31 will close the valve 35 stopping the flow of water through the hole 33.

I am not aware that valves controlled by a float have ever been made quick acting and I therefore make claim to such a valve broadly.

It is to be understood that the arrangement and construction of parts are capable of being radically changed from that shown and still be within the scope of my invention.

Having thus fully described my invention what I claim as new and desire to secure by Letters Patent of the United States is:

1. In an automatic valve, a valve chamber containing constant fluid pressure, an outlet from said chamber, a pivoted lever provided with a slot, a valve in said valve chamber to close said outlet and provided with a stem having a pin extending into said slot so as to provide lost motion between said valve and said pivoted lever, and spring pressed means for taking up said lost motion.

2. In a quick acting float valve, a pivoted lever provided with a float and a slot, a liquid supply valve chamber provided with an air chamber, a valve in said valve chamber arranged to close an opening in said chamber, a stem on said valve provided with a pin extending into said slot and a spring pressed lever to normally hold said pin in one end of said slot.

3. In a device of the class described, a valve, an operating lever for said valve, a pivotal pin upon which said operating lever is pivotally mounted, a second lever pivoted at one end to said operating lever and its free end arranged to engage the valve stem and means mounted on said pivotal pin for yieldingly holding the free end of said second lever against the valve stem.

4. In a device of the class described, a pivoted lever provided with a slot, a valve provided with a stem having a pin extending into the slot in the lever so as to provide lost motion between said valve and said lever, and spring pressed means for taking up the lost motion.

5. In a device of the class described, a valve, an operating lever for said valve, a second lever pivoted at one end to said operating lever and its free end arranged to engage the valve stem and means for yieldingly holding the free end of said second lever against the valve stem.

In testimony whereof I have signed my name to this specification, in the presence of two subscribing witnesses, this 30th day of September, 1907, at Chicago, Illinois.

CLARENCE E. ALLGEYER.

Witnesses:
MILTON LENOIR,
R. J. JACKER.